United States Patent
Milne

(10) Patent No.: US 9,932,898 B2
(45) Date of Patent: Apr. 3, 2018

(54) DRAIN PIPE ARRANGEMENT AND GAS TURBINE ENGINE COMPRISING A DRAIN PIPE ARRANGEMENT

(71) Applicant: Siemens Aktiengesellschaft, Munich (DE)

(72) Inventor: Trevor Milne, Sheffield (GB)

(73) Assignee: Siemens Aktiengesellschaft, Munich (DE)

(*) Notice: Subject to any disclaimer, the term of this patent is extended or adjusted under 35 U.S.C. 154(b) by 206 days.

(21) Appl. No.: 14/404,625

(22) PCT Filed: May 21, 2013

(86) PCT No.: PCT/EP2013/060378
§ 371 (c)(1),
(2) Date: Nov. 30, 2014

(87) PCT Pub. No.: WO2013/182413
PCT Pub. Date: Dec. 12, 2013

(65) Prior Publication Data
US 2015/0152786 A1    Jun. 4, 2015

(30) Foreign Application Priority Data
Jun. 8, 2012   (EP) .................................... 12171322

(51) Int. Cl.
*F02C 7/06* (2006.01)
*F01D 9/06* (2006.01)
(Continued)

(52) U.S. Cl.
CPC ............... *F02C 7/06* (2013.01); *F01D 9/065* (2013.01); *F01D 25/18* (2013.01); *F01D 25/32* (2013.01);
(Continued)

(58) Field of Classification Search
CPC ........ F01D 25/18; F01D 9/065; F01D 25/183; F02C 7/06; F02C 7/14; F16C 33/1025;
(Continued)

(56) References Cited

U.S. PATENT DOCUMENTS 2,764,427 A * 9/1956 Andrus ................... F16L 5/022
                                                    122/13.01
5,080,555 A    1/1992 Kempinger
(Continued)

FOREIGN PATENT DOCUMENTS

CA    2715600 A1 *  4/2011 ............. F01D 9/065
EP    1299619 B1    12/2006
(Continued)

OTHER PUBLICATIONS

JP Grant Decision dated Aug. 2, 2016, for JP application No. 2015-515459.
(Continued)

*Primary Examiner* — Pascal M Bui Pho
*Assistant Examiner* — Kyle Thomas
(74) *Attorney, Agent, or Firm* — Beusse Wolter Sanks & Maire

(57) ABSTRACT

A pipe arrangement for a turbomachine is provided having a fluid pipe for guiding fluids and a coupling element for coupling the fluid pipe to a temperature affected component. The coupling element is configured to provide a first connection between the coupling element and the component by a first end of the coupling element. The coupling element provides also a second connection between the coupling element and a first surface section of the fluid pipe by a second end of the coupling element. Furthermore, the coupling element has a sleeve portion surrounding a second surface section of the fluid pipe and being spaced apart to the second surface section of the fluid pipe. A fluid inlet or outlet
(Continued)

arrangement is also provided having such a pipe arrangement and also a gas turbine engine having such a pipe arrangement.

18 Claims, 6 Drawing Sheets

(51) Int. Cl.
   *F01D 25/18* (2006.01)
   *F01D 25/32* (2006.01)
   *F16L 59/18* (2006.01)
   *F16L 41/02* (2006.01)
   *F16C 33/10* (2006.01)
   *F01M 11/02* (2006.01)
   *F16C 17/03* (2006.01)

(52) U.S. Cl.
   CPC ........ *F16C 33/1025* (2013.01); *F16L 41/023* (2013.01); *F16L 59/18* (2013.01); *F01M 11/02* (2013.01); *F16C 17/03* (2013.01); *F16C 2360/23* (2013.01)

(58) Field of Classification Search
   CPC ..... F16L 41/023; F16L 59/18; F16N 2210/02; F01M 11/02
   USPC ........................ 285/53, 123.1, 123.3, 123.15
   See application file for complete search history.

(56) References Cited

U.S. PATENT DOCUMENTS

| | | | |
|---|---|---|---|
| 5,143,410 A | 9/1992 | Takikawa | |
| 5,746,574 A * | 5/1998 | Czachor | F01D 5/189 |
| | | | 285/368 |
| 6,412,820 B1 * | 7/2002 | Erps | F16L 19/005 |
| | | | 285/123.1 |
| 6,835,044 B2 * | 12/2004 | Frosini | F01D 9/065 |
| | | | 415/111 |
| 2003/0110778 A1 * | 6/2003 | Karafillis | F01D 25/16 |
| | | | 60/785 |
| 2010/0058729 A1 * | 3/2010 | Fomison | F01D 25/18 |
| | | | 60/39.08 |
| 2010/0132376 A1 | 6/2010 | Durocher et al. | |
| 2010/0275572 A1 * | 11/2010 | Durocher | F01D 9/065 |
| | | | 60/39.08 |

FOREIGN PATENT DOCUMENTS

| | | | |
|---|---|---|---|
| EP | 2042691 A2 | 4/2009 | |
| FR | 2664021 A1 | 1/1992 | |
| GB | 582082 A * | 11/1946 | ............ F01D 25/18 |
| GB | 623615 A * | 5/1949 | ............ F01D 9/065 |
| JP | S52153014 A | 12/1977 | |
| JP | S61020885 | 2/1986 | |
| JP | S62133931 U1 | 8/1987 | |
| JP | 02196137 A | 8/1990 | |
| JP | H02196137 A | 8/1990 | |
| JP | H09189041 A | 7/1997 | |
| JP | H09317406 A | 12/1997 | |
| JP | 2003307102 A | 10/2003 | |
| JP | 2007051574 A | 3/2007 | |
| RU | 2194176 C1 | 12/2002 | |
| SU | 1000059 A1 | 2/1983 | |
| WO | 0202912 A1 | 1/2002 | |
| WO | 0202913 A1 | 1/2002 | |

OTHER PUBLICATIONS

RU Official Decision of Grant dated Apr. 6, 2017, for RU patent application No. 2014141171.

* cited by examiner

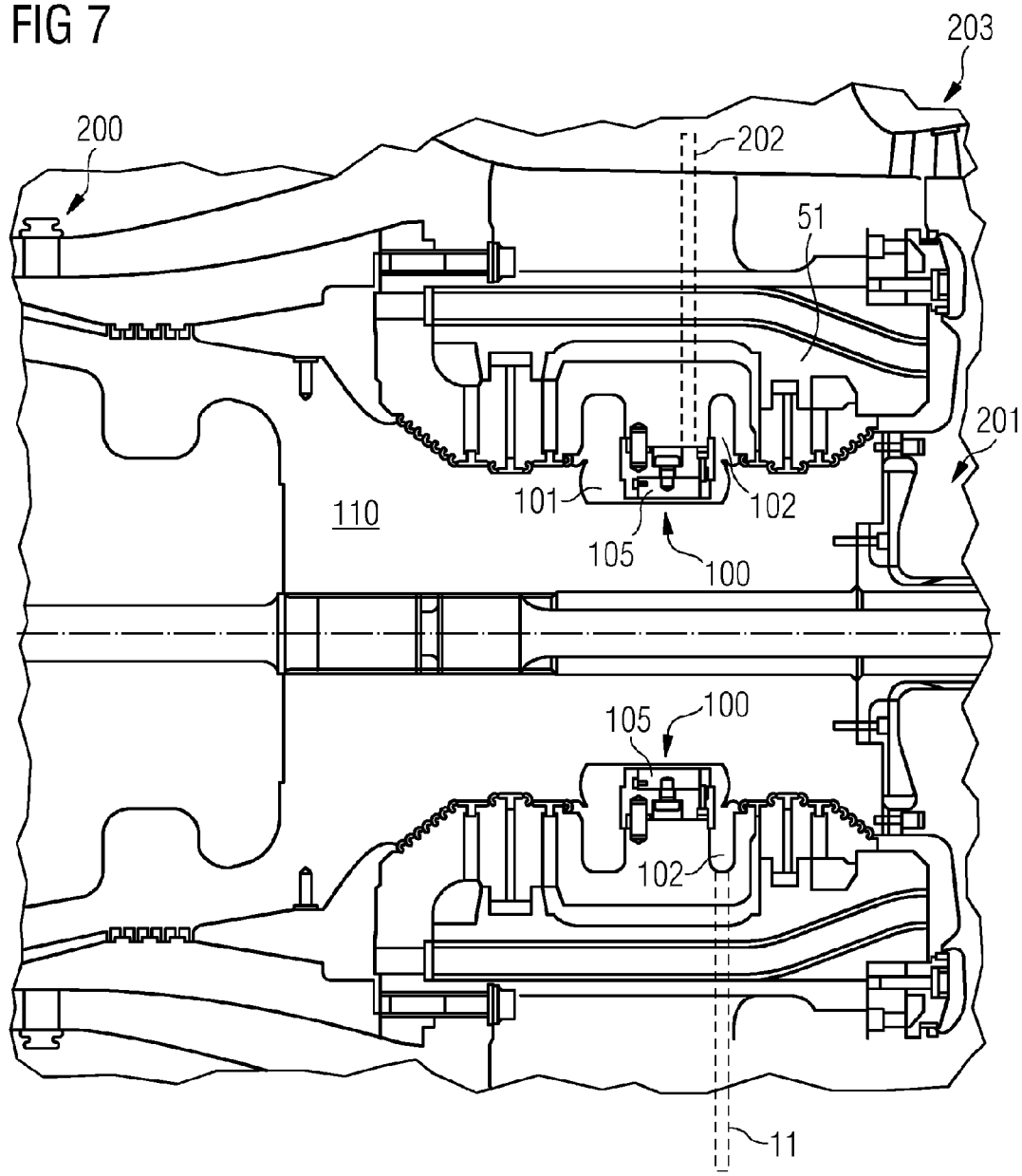

DRAIN PIPE ARRANGEMENT AND GAS TURBINE ENGINE COMPRISING A DRAIN PIPE ARRANGEMENT

CROSS REFERENCE TO RELATED APPLICATIONS

This application is the US National Stage of International Application No. PCT/EP2013/060378 filed May 21, 2013, and claims the benefit thereof. The International Application claims the benefit of European Application No. EP12171322 filed Jun. 8, 2012. All of the applications are incorporated by reference herein in their entirety.

FIELD OF THE INVENTION

The invention relates to a pipe arrangement, fluid inlet or outlet arrangement, and/or a gas turbine engine, wherein particularly drained lube oil guided by the pipe arrangement may be affected by temperatures outside the preferred operating point for the fluid particularly in respect of temperatures which can e.g. lead to carbonisation of the pipe arrangement.

BACKGROUND OF THE INVENTION

In a gas turbine engine or any type of turbomachine a rotor is provided to particularly rotate compressor blades and/or turbine blades about an axis. To allow this rotation the rotor will be connected to a stator via bearings. These bearings may be lubricated by lube oil provided from an oil tank.

Lube oil from the bearing may be guided back to the oil tank via one or more drain pipes. There may be limited space within the core of the gas turbine engine or the turbomachine through which the drain pipe must be routed. The areas directly surrounding these drain pipes may have different temperatures along the length of the drain pipes, as a casing of the gas turbine engine or the turbomachine will experience typically higher temperatures than the ambient temperature surrounding the gas turbine engine. This is due to the fact that a working fluid will be heated by combustors and that air extracted from a compressor even though probably extracted for cooling a hot turbine region may also have an increased temperature level.

After a longer period of operation in conventional designs in an interior of the drain pipes a carbonised layer may be formed. This may be experienced as the drained lube oil may be overheating due to the mentioned temperature effects.

As a result, lubrication characteristics of the oil are deteriorated. And even further, flakes of the carbonised layer can possibly break loose and block oil filters requiring additional maintenance.

SUMMARY OF THE INVENTION

The present invention seeks to mitigate these drawbacks.

This objective is achieved by the independent claims. The dependent claims describe advantageous developments and modifications of the invention.

In accordance with aspects of the invention there is provided a pipe arrangement for a turbomachine—particularly a drain pipe arrangement for drainage of lube oil from bearings, particularly applied for bearings of a gas turbine engine—comprising a fluid pipe for guiding fluids, e.g. a liquid like oil or lubricant, and a coupling element for coupling the fluid pipe to a temperature affected component.

"Temperature affected" means that during operation a temperature difference between the component in comparison to ambient temperature. The component may particularly be a casing—in particular a casing of a gas turbine engine —, a strut of such a casing, a frame or a spacer or a different component attached as an intermediate piece to the casing. It has to be noted that during operation the temperature of a gas turbine engine casing can be hot, e.g. 400° C. or even 600° C.

In accordance with aspects of the invention the coupling element is configured to be able to provide a first connection—possibly in a detachable way—between the coupling element and the component by a first end of the coupling element. The first end may particularly be a first axial end of the coupling element considering that the coupling element, surrounding a centre line or curve in which extension the axial direction is defined, may for example be substantially rotational symmetric about an axis.

Furthermore the coupling element provides a second connection between the coupling element and a first surface section of the fluid pipe by a second end—particularly at a second axial end opposite to the first axial end—of the coupling element. According to aspects of the invention, the coupling element comprises a sleeve portion—particularly arranged between the first end and the second end—surrounding a second surface section of the fluid pipe and being spaced apart to the second surface section of the fluid pipe.

More particularly, the sleeve portion is concentric or coaxial with the second surface section, especially in the section defined by the second pipe section.

Advantageously the sleeve portion may be elongated. Furthermore the sleeve portion may be cylindrical or may have the shape of a truncated cone but other shapes are possible as discussed later.

The first surface section of the fluid pipe may particularly be an outer surface or a shell surface of the fluid pipe. "Outer" means facing away from a centre axis—e.g. an axis of rotation—of the fluid pipe.

Based on aspects of the invention, the sleeve portion of the coupling element is distant to the second surface section of the fluid pipe, particularly continuously spaced apart without any struts or means for stabilizing.

According to aspects of the invention the sleeve portion may particularly extend also over the first end of the coupling element so that it is clear that the first end is not in physical contact to the fluid pipe at the first end. In other words, the first end is also spaced apart from the second surface section of the fluid pipe. Thus the only area of contact between the coupling element and the fluid pipe is by the second connection.

As a consequence, during operation when the component is at a temperature level above ambient temperature, the heat transfer from the component to the fluid pipe is reduced or even stopped in the area of the sleeve portion. The heat transfer is limited to the area of the first surface section. In the latter area heat will be transferred to the fluid pipe but due to the reduced surface size of contact the fluid pipe will not become as hot as in conventional designs. Additionally the contact point between the fluid pipe and the component (i.e. the heat sink) will be moved further away from the first end.

The fluid pipe will be kept cool without additional active cooling features or without specific measures e.g. of increasing the velocity of the fluid.

The invention is particularly advantageous for gas turbine engines, when the component referenced above is represented by the casing of the gas turbine, when the fluid is lube oil for bearings of the gas turbine and the fluid pipe is configured as drain pipe for bearings, via which lube oil from the bearings is guided back to an oil tank. The pressure difference creating the flow from the bearing to the tank of lube oil is typically relying on gravitation. In this configuration the casing may be heated during operation up to for example 400° C. to 600° C. as a side effect of compression of air and of combustion processes. Furthermore in such a gas turbine the velocity of lube oil in the drain pipe may be low, at least in specific modes of operation. With these temperatures the potential problem of increased temperature in the drain pipe—particularly at an inner wall of the pipe—is present and together with the slow flow of lube oil this could lead in prior art configurations to the lube oil overheating and forming a carbonised layer on the inner surface of the drain pipe. In addition to the lubrication characteristic of the oil being deteriorated flakes of the carbonised layer can break loose and block the oil filters requiring additional maintenance. This is overcome by the invention as the contact point between the drain pipe and the casing is moved further away from the hot casing. By this separation in space the drain pipe is kept cool.

The invention is furthermore advantageous as only minor changes are needed compared to the conventional design.

Furthermore it is advantageous that traditional methods to keep the drain pipe cool like showering the inside of the pipe with enough oil to avoid volumes of oil to become stationary or to become heated enough for carbonisation to take place, or like surrounding the drain pipe with a layer of cooler air that can vent away via convective heat transfer any radiation or conduction from the surrounding areas picked up by the drain pipe, are not needed anymore or may only be needed to a lesser extent. The use of a separate insulation layer e.g. mineral wool around the drain pipe, which would reduce the maximum cross section of the drain pipe and thereby the capacity of flow throughput of lube oil back to a tank is not needed anymore or may only be needed to a lesser extent.

As one of the configurations of the invention the second end may comprise a mating surface facing a first axis of symmetry of the coupling element for mating the first surface section of the fluid pipe, the first surface section facing away from a second axis of symmetry of the fluid pipe.

Different configurations of the sleeve portion are possible. In a first embodiment, the sleeve portion may be spaced apart to the second surface section of the fluid pipe such that a cavity is formed following a shape of a side face of a cylinder, a side face of an elliptic cylinder, or even a side face of an oval cylinder. Alternatively the sleeve portion may be spaced apart to the second surface section of the fluid pipe such that that the cavity has for example a rectangular or triangular or square cross section.

The sleeve portion may also be spaced apart to the second surface section of the fluid pipe such that a cavity is formed with opposing surfaces having a substantially identical distance to each other.

Advantageously an inner diameter of the coupling element at the second end may be smaller than the inner diameter at the first end. With "inner diameter" meaning the medium distance between two opposite points on the surface of the sleeve portion, this surface facing the fluid pipe. It has to be noted that the sleeve portion may not form a perfect cylinder but may be of a different shape. In this case "diameter" may be a parameter that can not be defined. In this case one could compare an expanse of a cross section of the surrounded space of the sleeve portion compared to an expanse of a cross section of the second connection.

In another embodiment the cavity may be built such as the fluid pipe has an unvaried cross section over an axial expanse of the second surface section and the coupling element comprises a recess or step, particularly a recess or step on an inner surface of the coupling element. Alternatively the cavity may be built such as the fluid pipe comprises a section of reduced diameter or reduced wall thickness and the coupling element has an unvaried cross section over an axial expanse of the coupling element. By this again a recess or step is formed, this time on the outer surface of the fluid pipe. As a further alternative both of these configurations can be combined such that the cavity may be built such as the fluid pipe comprises a section of reduced diameter or wall thickness forming a recess or step and the coupling element comprises a further recess or step.

Here again it has to be noted that there may be configurations that are not symmetric. Nevertheless the principle of providing a step can be applied to different geometry of pipes.

To provide a good insulation effect, the sleeve portion and the area of the section connection may be free of passages to the cavity. Air may only be able to travel via an opening between the first end and the fluid pipe as this end may not be sealed. This may lead to an air cushion with reduced heat transfer from the hot sleeve portion to the fluid pipe.

Particularly, an area of contact between the coupling element and the fluid pipe may be limited to the second connection. That means that for example the sleeve portion has no struts or connections which would provide physical contact with the second surface section of the fluid pipe. The opposing surfaces of the second surface section and the sleeve are connectionless in the area of the sleeve.

Additionally also the first end may be spaced apart to the fluid pipe, particularly spaced apart to the second surface section of the fluid pipe.

According to a further embodiment the first end of the coupling element may be arranged as a flange or collar or shroud. The first end may have an overall cylindrical outer shape. Thus the coupling element has a first end with a first diameter over a specific first height and a remaining part with a second diameter smaller than the first diameter, the second diameter extending over a second height greater than the first height.

The coupling element may particularly be built monolithic.

In one embodiment, the fluid pipe and the coupling element may—together—be built monolithic. Alternatively the fluid pipe and the coupling element may be separate parts and the second connection may be provided particularly by welding or brazing or alternatively by shrink fitting or threading or clamping on the coupling element to the fluid pipe.

So far it was focused on the pipe arrangement arranged to cooperate with a component or casing. In the following the complete combined arrangement of pipe arrangement and component will be discussed in more detail.

The invention is also directed to a fluid inlet or outlet arrangement comprising a pipe arrangement as defined and discussed in the previous sections and a temperature affected component as introduced also before, particularly a casing, to which the pipe arrangement is connected via the first connection between the coupling element and the component by a first end of the coupling element.

With "inlet arrangement" it is meant an arrangement by which fluid will be guided to a component or into a component, e.g. for fluid supply. With "outlet arrangement" it is meant an arrangement by which fluid will be guided from a component, e.g. for drainage of the fluid.

Not fully discussed so far, the fluid inlet or outlet arrangement may particularly be arranged such that the fluid pipe may comprise a first pipe section piercing the component (e.g. the casing of a gas turbine) and a second pipe section projecting—i.e. outwardly—from the component, the fluid pipe and the component being contact-less in the first pipe section. As a consequence the contact is limited by the second connection which reduces the heat transfer from the component to the fluid pipe.

It has to be noted that for a gas turbine configuration the bearings will be located at the rotor near the centre axis of the gas turbine engine. Furthermore the gas turbine engine rotor will be housed within a casing. Oil tanks for lube oil will be position outside of the casing. Thus, "fresh"—typically pressurised—lube oil needs to pass through the casing via pipes so that it can be provided to the bearings and particularly the bearing surfaces. Furthermore, drained lube oil will be guided away from the bearings via drain pipes which again pass through the casing. Besides, the drain pipes need to be fixed to the casing. This is realised by the inventive coupling element, in particular by the first connection.

In an embodiment, the first end of the coupling element may be configured as a flange and the first connection between the coupling element and the component by the first end of the coupling element may be provided by at least one connecting member, particularly a bolt or a stud or a screw, inserted into a bore hole through the flange of the first end.

The fluid pipe may be gravity driven. The fluid may be transported with additional pressure applied only by the spatial orientation of fluid pipe. In an embodiment the fluid pipe may be oriented in a 20° to 50° angle, particularly in a 30° to 45° angle, in regards to a vertical axis.

The decline of the fluid pipe may be substantially 250% to 85% in relation to the horizontal, in particular 170% to 140%.

Such a decline or such an angle allows an "automatic" fluid flow also for fluids with reduced velocity, like oil, only caused by gravity. It also allows for operating conditions when the gas turbine is moving relative to the ground or horizon e.g. when on board a ship or an oil platform.

Particularly, the fluid pipe may be substantially straight.

Besides the previous embodiments, the invention is also directed to a gas turbine engine, comprising a compressor, a combustor, and a turbine. Furthermore it comprises a fluid inlet or outlet arrangement as defined before, wherein the fluid pipe is located upstream of a compressor inlet or downstream of a compressor exit, the latter being possibly experiencing most benefit from the invention. The position may be particularly in a turbine section of the gas turbine engine or a transition section between a compressor section and the turbine section of the gas turbine engine. Obviously the location of the fluid inlet or outlet arrangement depends on the position of the bearings which again is based on distribution of weight and load along the gas turbine expanse. The invention is particularly applicable for configurations in which the fluid inlet or outlet arrangement may be located in an area of higher temperature.

Probably heat from a combustor is transferred—as a side effect—also to the component, e.g. the casing. Particularly, the component will be affected by a first temperature which is greater than ambient temperature during operation.

As a consequence the component will heat up and will also act itself as a heat radiator.

According to the invention the second connection between the second end of the coupling element and the first surface section of the fluid pipe acts as a thermal bridge. Differently, the sleeve portion being spaced apart to the second surface section of the fluid pipe acts as a thermal barrier.

In a further embodiment, the coupling element may comprise passive cooling features, particularly ribs, on an outward surface of the sleeve portion for increased heat transfer between the outward surface of the sleeve portion and ambient air during operation.

The discussed invention is advantageous if applied to a gas turbine engine, a compressor, or any type of turbomachinery. It may also be advantageous for any type systems with high temperature differences and temperatures that will lead to degration or carbonisation of fluids.

Quite contrary to the previous discussed gas turbine implementation the invention may also be applied to inverse operating temperatures, e.g. for a process compressor where the casing as the component may have a temperature that is low, sub zero, and the fluid or oil temperature need to be maintained above a certain level for it to flow.

Furthermore the pipe arrangement may have positive effects for fluid pipes that guide oil or lubricants from the bearings (as drain pipes) but also for fluid pipes that guide oil or lubricants to the bearings (as supply pipes).

Term "fluid pipe" is used within this document to define a pipe that is set up to transport fluids, particularly liquids. Besides, the invention may also be advantageous for gaseous fluids.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying drawings, of which:

FIG. 7: illustrates the position of the inventive pipe arrangement within a gas turbine engine.

The illustration in the drawing is schematical. It is noted that for similar or identical elements in different figures, the same reference signs will be used.

Some of the features and especially the advantages will be explained for an assembled gas turbine, but obviously the features can be applied also to the single components of the gas turbine but may show the advantages only once assembled and during operation. But when explained by means of a gas turbine during operation none of the details should be limited to a gas turbine while in operation.

DETAILED DESCRIPTION OF THE INVENTION

The exemplary embodiments focus on a gas turbine engine with a casing 20 as a temperature affected component when the gas turbine engine is in operation. It is focused on a pipe arrangement 10 comprising a drain pipe 11 as a fluid pipe for guiding oil as a fluid from bearings 100 of the gas turbine engine to an external oil tank.

Figure 2:
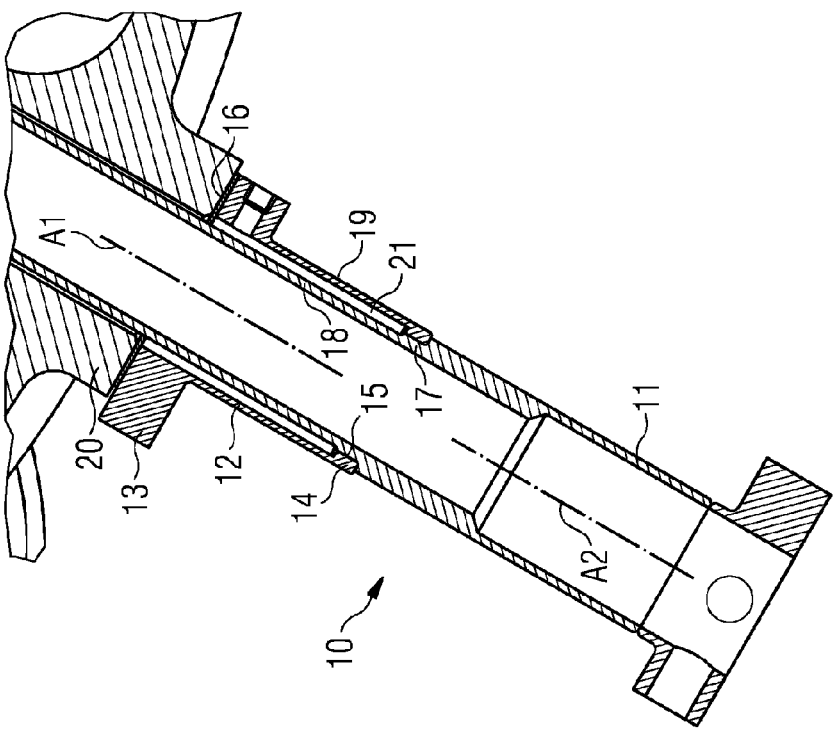
FIG. 2: illustrates a first embodiment of an inventive pipe arrangement.
Figure 1:
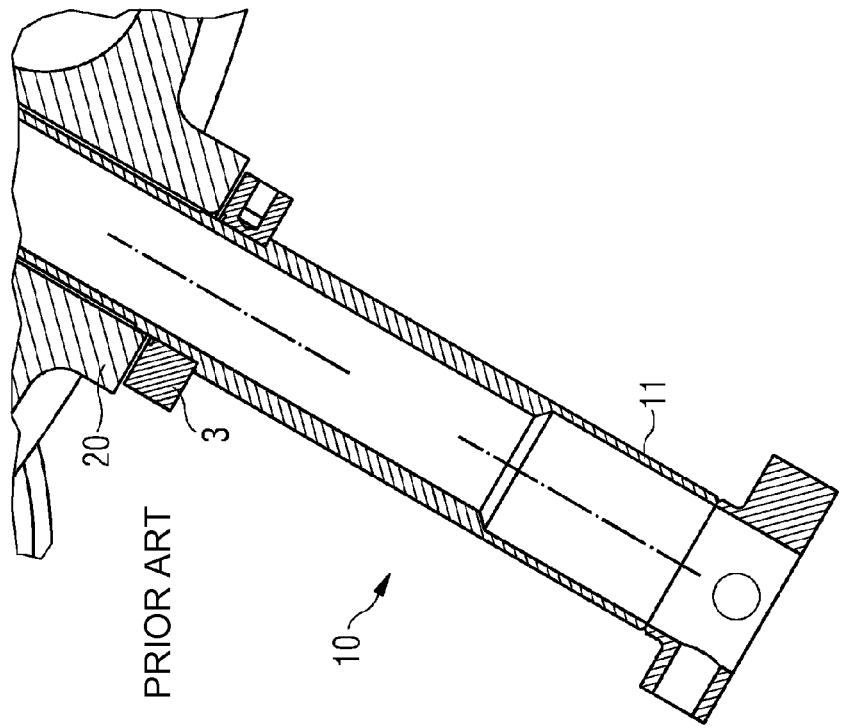
FIG. 1: shows schematically a prior art pipe arrangement.

Such a configuration is shown in FIGS. 1 and 2, wherein FIG. 1 shows a prior art design whereas FIG. 2 shows the inventive solution. The like elements will be referenced with the same reference numerals.

As a coupling element 3 merely a flange is present in FIG. 1 to couple the drain pipe 11 to the casing 20.

FIG. 2 shows an improved coupling element 12 which comprises a collar 13—which could also be called flange—as a first end of the coupling element 12.

The coupling element 12 is present to attach the drain pipe 11 to the casing 20. The attachment may be executed via a connecting member that can be removed for inspection or maintenance so that the pipe arrangement can be removed from the casing 20. The connecting member may be placed through a bore hole of the collar 13 and may be connected to the casing 20 such that a first connection 16 between the collar 13—and therefore also the coupling element 12—and the casing 20 is established.

Even though a direct connection between the collar 13 and the casing 20 is shown in FIG. 2, there possibly may be an intermediate part present in between these two parts, e.g. a disc or a gasket.

According to FIG. 1, the flange of the coupling element 3 will also provide the connection to the drain pipe 11 by its radial inward surface, assuming the coupling element 3 is rotational symmetric about an axis and a radial direction is being perpendicular to the axis. However, in the shown embodiment the connection is not rotational symmetric, particularly due to restrictions in space and design.

Differently, in FIG. 2 the coupling element 12 is elongated along its axis, i.e. coupling element axis A1. Again we assume the coupling element 12 is rotational symmetric about this coupling element axis A1. An axial direction is defined in a direction along this axis A1. A radial direction is being perpendicular to this axis A1.

It has to be noted that rotational symmetry is not necessary but may simplify the explanation. Further shapes will be discussed later.

If the collar 13 is considered to be at a first axial end of the coupling element 12, the coupling element 12 comprises means for providing a second connection 17, the second connection 17 being established between the coupling element 12 and the drain pipe 11. The means for providing the connection 17 are a second end 14 of the coupling element 12 which is located at the opposite axial end of the coupling element 12 in regards to the collar 13, the second end 14 being fixedly connected to the drain pipe 11. This second connection 17 is established via connecting a radial inward facing surface of the second end 14 with a radial outward facing first surface section 15 of the drain pipe 11.

For this configuration it is assumed that the drain pipe 11 is elongated along its own axis, i.e. pipe axis A2. It is assumed the drain pipe 11 is—at least in parts—rotational symmetric about this pipe axis A2. An axial direction for the drain pipe 11 is defined in a direction along this pipe axis A2. A radial direction is being perpendicular to this pipe axis A2.

Typically the coupling element axis A1 and the drain pipe axis A2 will be identical in position and orientation.

The second connection 17 may have a limited mating surface size such that a heat transfer via this interface is limited. Particularly the axial length of the second connection 17 may be similar to the width of a wall of the drain pipe 11. Particularly the axial length of the second connection 17 may be 50%, 25%, 10%, or 5% of the axial expanse of the collar 13.

To limit the heat transfer to just this second connection 17 interface, the coupling element 12 also comprises a sleeve portion 19 between the collar 13 and the second end 14. According to the invention this sleeve portion 19 is spaced apart to/from a second surface section 18 of the drain pipe 11 such that a cavity 21 is formed between an inner surface of the sleeve portion 19 and an outer surface of the second surface section 18.

With this cavity 21, which is also elongated in axial direction, insulation of the drain pipe 11 will take place in the second surface section 18 such that the heat transfer is substantially limited to the area of the second end 14.

This is advantageous as the contact area at the second end 14 between the coupling element 12 and the drain pipe 11 is limited in expanse. Furthermore, due to the elongated form of the sleeve portion 19, the second end 14 will be further away from the hot casing 20. Even though there will be a heat transfer via the first connection 16 from the casing 20 to the collar 13, less heat will be applied via its remote second connection 17.

According to FIG. 2, the drain pipe 11 and the coupling element 12 is cylindrical. In a further embodiment the drain pipe 11 and the coupling element 12 may be elliptic-cylindrical or even oval-cylindrical, i.e. being a cylinder with an elliptic and oval cross section, respectively. Instead of being cylindrical, as described above the coupling element 12 may have the shape of a truncated cone. Other shapes may possible, e.g. any curved drain pipe wall or even a drain pipe wall with an oval, a triangular, a rectangular, or square cross section, the cross section being located in a radial plane.

Also it has to be acknowledged that the drain pipe does not need to be a perfect cylinder or truncated cone. As it has to be understood the inventive idea also is reached with slight modified shapes of the introduced parts.

Independently of cross sectional configuration, at least the sleeve portion 19 and the second surface section 18 are surrounding each other. According to the embodiment of FIG. 2 they are substantially concentric. Advantageously radial inner surfaces of the whole coupling element 12 may be concentric with the drain pipe 11 outer surfaces.

According to the invention, the only point of contact between the drain pipe 11 and the coupling element 12 is the second connection 17. Particularly also in the area of the collar 13, the coupling element 12 is spaced apart to the drain pipe outer wall.

According to an embodiment of a drain pipe 11, as discussed in the embodiments, the collar 13 as the first end represents an upstream end in respect of the fluid flow through the drain pipe 11. The second end 14 represents a downstream end in respect of the fluid flow through the drain pipe 11.

Figure 3:
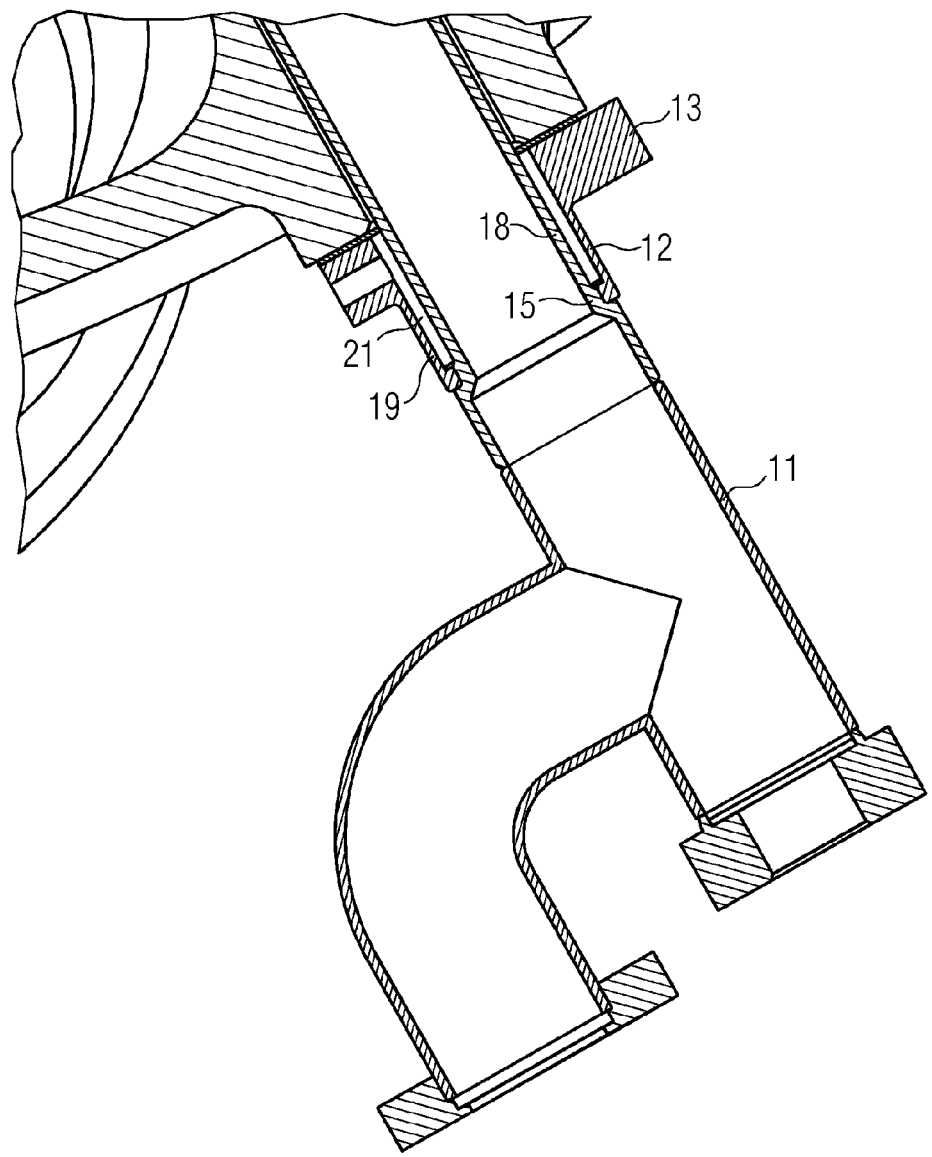
FIG. 3: illustrates a second embodiment of an inventive pipe arrangement.

FIG. 3 shows a different embodiment of the pipe arrangement. The coupling element 12 may have a shorter sleeve portion 19 than the one in FIG. 2. Also the drain pipe 11 may have a branch in a region distant to the introduced first and second surface sections 15, 18. The cavity 21 will again extend between the outer surface of the drain pipe 11 and the inner surface of the coupling element 12 over the sleeve portion 19 and the portion of the collar 13.

Figure 4:
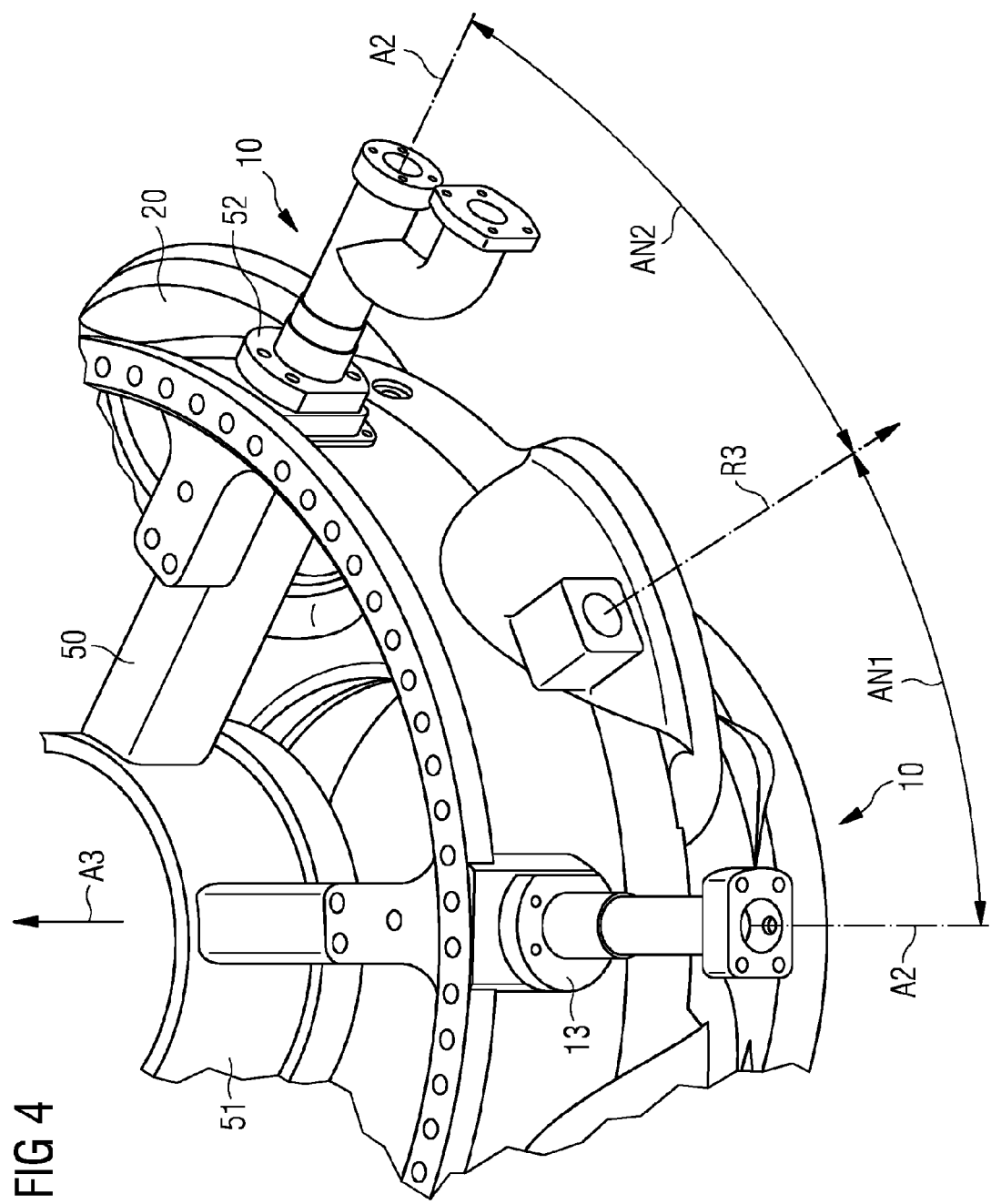
FIG. 4: shows schematically an installed inventive pipe arrangement in a gas turbine engine.

FIG. 4 depicts a possible location of the two pipe arrangements 10 as introduced by the FIGS. 2 and 3 in a broken three-dimensional drawing. An axial direction of the whole gas turbine engine is indicated by axis A3. A radial direction pointing to the ground on which the gas turbine engine will be position is indicated by direction R3. The two pipe arrangements 10 are connected to the casing 20. Besides, the pipe arrangements 10 are also enclosed by struts 50 of the gas turbine engine which are facing towards the axis A3 of the gas turbine engine.

Figure 6:
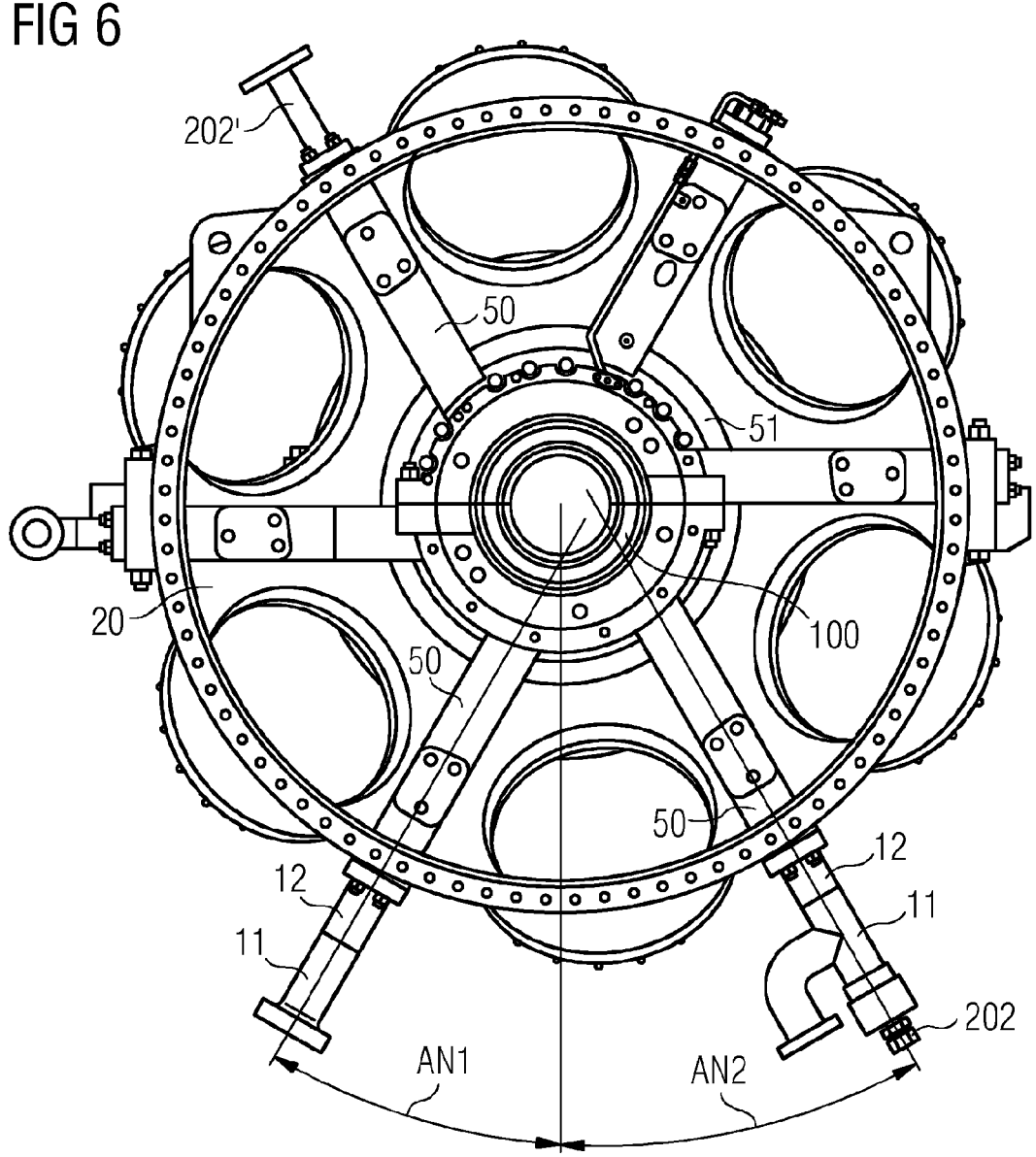
FIG. 6: illustrates the position of the inventive pipe arrangement within a gas turbine engine.

Not shown in detail or not even shown at all—but in parts introduced in FIG. 7—is a rotor 200, combustors, the bearings 100 and other parts of the gas turbine engine 201. The bearings 100 may be located near the central cylindrical body 51. In this central cylindrical body 51 cavities 101, 102 may be present on the one hand to provide lube oil to the bearings 100 or on the other hand to collect and guide away lube oil from the bearings 100, as well as guides for seal air supply and breather extractions to contain the lube oil inside the central cylindrical body 51. A specific cavity (101 or 102) may be connected to a specific drain pipe 11 which is placed within the strut 50. The external oil supply to the bearings 100 is shown in FIG. 6 and identified by reference symbol 202.

In an embodiment a further point of contact between the drain pipe 11 and the casing 20 besides the collar 13 may be located within the central cylindrical body 51, particularly in a region close to the bearings 100. Besides these few points of contact the drain pipe 11 may be spaced apart by a surrounding annular cavity similar to the cavity 21, e.g. as a continuation of the cavity 21, from the strut 50.

In FIG. 4 also a first angle AN1 between the pipe axis A2 of a first drain pipe arrangement 10 and the radial direction R3 pointing to the ground is indicated. Furthermore a second angle AN2 between the pipe axis A2 of a second pipe arrangement 10 and the radial direction R3 pointing to the ground is also indicated. These angles AN1, AN2 may particularly be substantially 20°, 25°, 30°, 35°, 40°, 45°, or 50°. Thus the lube oil may be in continuous flow due to the mere gravity.

Also shown in FIG. 4 are holes 52 in the collar 13 that will allow insertion of connectors for fixing the coupling element 12 via its collar 13 to the casing 20. The connectors can be bolts, screws or other elements as disclosed before.

Figure 5:
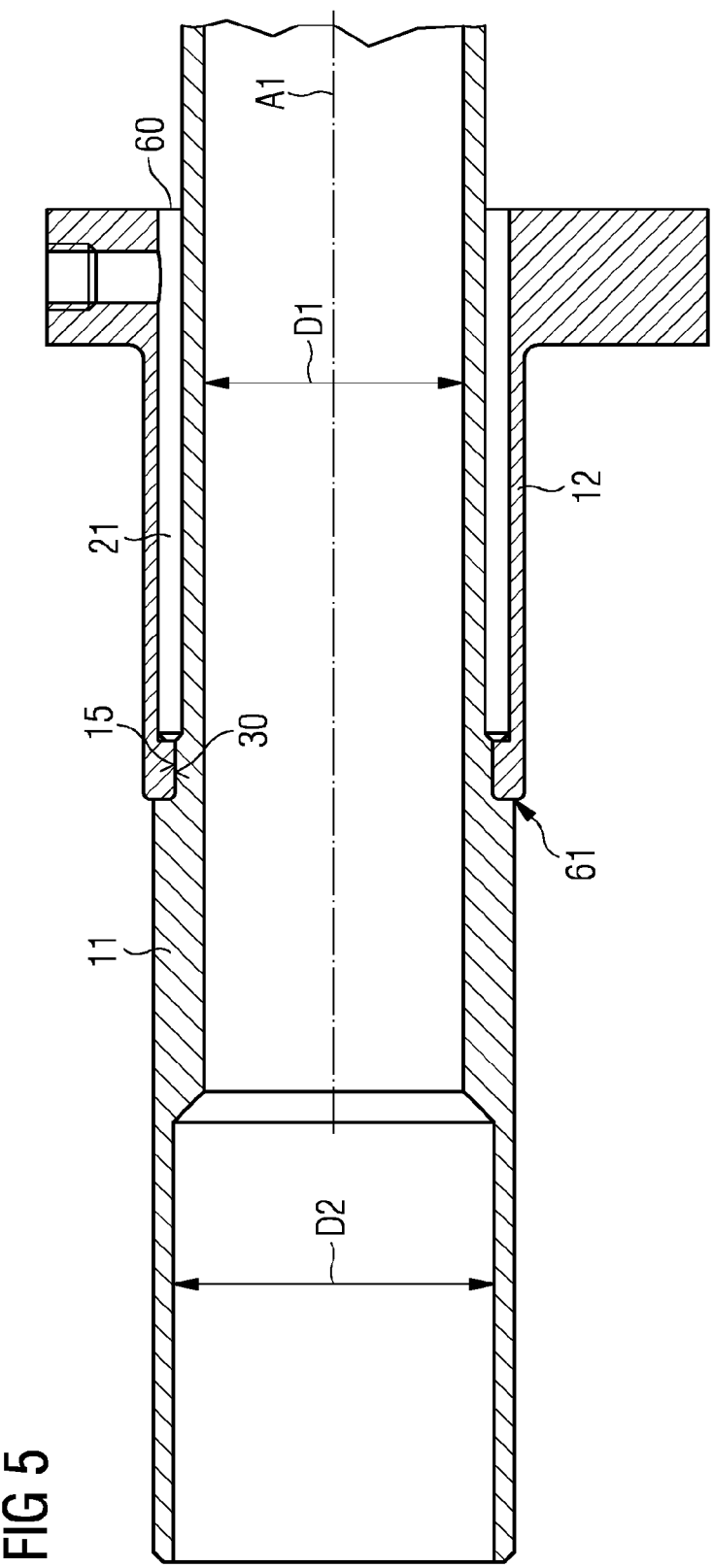
FIG. 5: illustrates some details of the inventive pipe arrangement as shown in FIG. 2.

In FIG. 5 the embodiment of FIG. 2 is shown in a larger scale. The cavity 21 can be seen in more detail. Especially it can be seen that the annular cavity 21 even has an annular opening 60 in axial direction at the axial end of the collar 13 (the first end).

More precisely as before the mating surfaces at the second end 14 are shown. The first surface section 15 of the coupling element 12 is indicated. Also the opposite surface of the drain pipe 11 is clearly indicated as contact surface 30.

Furthermore an outer step 61 of the drain pipe 11 is indicated which provided a stop for the coupling element 12 for assembly in proper position.

According to the depicted embodiment, the drain pipe inner diameters D1, D2 may change in diameter. In the area of the coupling element 12 and further upstream the diameter D1 will be present which is less than the diameter D2, which will be present at a downstream end of the drain pipe 11.

FIG. 6 illustrates similar to FIG. 4 the positioning of the pipe arrangement 10 within a gas turbine engine. A central part of the casing 20 is shown from an axial view from a rotational axis of the gas turbine engine. The drawing is oriented horizontally like a gas turbine installed on a ground surface. Lube oil may be provided via an inlet pipe 202, which may be oriented in a way that lube oil will be guided against upwards—oriented with a vector component against the gravity—to the centre of the gas turbine engine. Alternatively lube oil could also be provided via an inlet pipe 202', which would provide the lube oil downwards—oriented with a vector component in direction of the gravity. The lube oil will be guided through that inlet pipe 202 to the central axial area of the gas turbine engine to the central cylindrical body 51 where the bearings 100 are located. The inlet pipe will be in an angle to the vertical axis—the direction of the gravity vector—of the gas turbine. Furthermore two drain pipes 11 are indicated which are directed also in an angle to the vertical axis—indicated by angles AN1 an AN2—and from which a major part is mainly installed within the strut 50. Two coupling elements 12 are shown providing the connection between the casing 20 and the drain pipe 11.

FIG. 7 illustrates this configuration as a sectional view as a cut through the axis of the gas turbine engine 201. The central cylindrical body 51 is also indicated. The bearing 100 is indicated as a cut through a bearing pad and other pieces of the bearing. The compressor 200 is only indicated by a vane of the last stage of the compressor. A turbine section 203 is indicated by a first stage of blades and vanes. Thus, as shown in the figure, the bearing 100 is located in a hot region of the gas turbine engine 201. The inlet pipe 202 for providing lubricants to the bearings 100 is indicated by a dashed line as it will not be located in the same plane as the sectional cut in FIG. 7. The inlet pipe 202 will end in a conduit system (not shown) distributing the lubricant to the surface of the bearing pad 105 facing the rotor, i.e. a rotor part 110. Annular cavities 101 and 102 on opposite sides of the bearing 100 collect lubricants that exited the bearing 100. From those cavities 101, 102 the drain pipe 11 will divert. The drain pipe 11 for draining the lubricants from the bearings 100 is again indicated by a dashed line as it will also not be located in the same plane as the sectional cut in FIG. 7.

As it can be acknowledged from FIGS. 6 and 7, the bearings may be located in a hot region of the gas turbine engine 201 near the combustors. Therefore the casing 20 in that region and the struts 50 may also be of that temperature. The invention allows to thermally decouple the drain pipe and the transported drain oil from the hot casing 20 and the hot struts 50.

As previously said the disclosed inventive pipe arrangement is beneficial as lube oil may not deteriorate in quality due to that excessive heat within the drain pipe can be avoided.

The invention claimed is:

1. A pipe arrangement for a turbomachine for drainage of lube oil from bearings, comprising:

a fluid pipe for guiding fluids, the fluids being the lube oil, from the bearings of the turbomachine and a coupling element for coupling the fluid pipe to an outer casing of the turbomachine, wherein the coupling element is configured to provide a first connection between the coupling element and the outer casing of the turbomachine by a first end of the coupling element that is secured to the outer casing of the turbomachine in a manner effective to prevent movement of the coupling element relative to the outer casing of the turbomachine, the coupling element provides a second connection between the coupling element and a first surface section of the fluid pipe by a second end of the coupling element, wherein the fluid pipe comprises an area of reduced outer diameter that forms the first surface section, wherein the coupling element abuts a step in the fluid pipe adjacent the first surface section, effective as a stop to prevent movement of the first surface section toward the first end of the coupling element the coupling element comprises a sleeve portion surrounding a second surface section of the fluid pipe and being spaced apart to the second surface section of the fluid pipe, wherein the sleeve portion extends from the first end of the coupling element to the second end of the coupling element and comprises an inner diameter that does not vary along an entire axial length of the sleeve portion, wherein an area of contact between the coupling element and the fluid pipe is limited to the second connection, and wherein the fluid pipe comprises a first pipe section that fully pierces the outer casing of the turbomachine and a second pipe section projecting from the outer casing of the turbomachine, the first pipe section being contact-less where piercing the outer casing of the turbomachine, and wherein the second end of the coupling element comprises a mating surface facing an axis of symmetry of the coupling element for mating the first surface section of the fluid pipe, the first surface section facing away from an axis of symmetry of the fluid pipe.

2. The pipe arrangement according to claim 1,
wherein the sleeve portion is spaced apart to the second surface section of the fluid pipe to form a cavity following a shape of a side face of a cylinder or a side face of an elliptic cylinder or a side face of a truncated cone, or
wherein the cavity has a rectangular or triangular or square cross section.

3. The pipe arrangement according to claim 2, wherein
the cavity is built such that the fluid pipe has an unvaried cross section or wall thickness or diameter over an axial expanse of the second surface section and the coupling element comprises a section of increased cross section or wall thickness or diameter, or
the cavity is built such that the fluid pipe comprises a section of reduced cross section or wall thickness or diameter and the coupling element has an unvaried cross section over an axial expanse of the coupling element, or
the cavity is built such that the fluid pipe comprises the section of reduced cross section or wall thickness or diameter and the coupling element comprises the section of increased cross section or wall thickness or diameter.

4. The pipe arrangement according to claim 2,
wherein the sleeve portion is free of passages to the cavity.

5. The pipe arrangement according to claim 1,
wherein the sleeve portion is spaced apart to the second surface section of the fluid pipe to form a cavity with opposing surfaces having an identical distance to each other.

6. The pipe arrangement according to claim 1,
wherein the sleeve portion of the coupling element is continuously spaced apart to the second surface section without any struts or means for stabilizing.

7. The pipe arrangement according to claim 1,
wherein the first end of the coupling element is spaced apart from the second surface section of the fluid pipe and the first end of the coupling element is not in physical contact with the fluid pipe at the first end of the coupling element.

8. The pipe arrangement according to claim 1,
wherein the sleeve portion is spaced apart from the second surface section of the fluid pipe to form a cavity and the cavity extends over the sleeve portion and the first end.

9. The pipe arrangement according to claim 1,
wherein the first end of the coupling element is arranged as a flange, collar, or shroud.

10. The pipe arrangement according to claim 9, wherein the first end of the coupling element is arranged as a flange oriented perpendicular to the axis of symmetry of the coupling element.

11. The pipe arrangement according to claim 1, wherein
the fluid pipe and the coupling element are built monolithic, or
the fluid pipe and the coupling element are separate parts and the second connection is provided by welding, brazing, shrink fitting, threading, or clamping on.

12. A fluid inlet or outlet arrangement comprising the pipe arrangement according to claim 1, and
the outer casing of the turbomachine to which the pipe arrangement is connected via the first connection between the coupling element and the outer casing of the turbomachine by the first end of the coupling element.

13. The fluid inlet or outlet arrangement according to claim 12,
wherein the first end of the coupling element is configured as a flange, and the first connection between the coupling element and the outer casing of the turbomachine by the first end of the coupling element is provided by at least one connecting member inserted into a bore hole through the flange of the first end.

14. The fluid inlet or outlet arrangement according to claim 13,
wherein the at least one connecting member comprises a bolt or a stud or a screw.

15. The fluid inlet or outlet arrangement according to claim 12,
wherein the fluid pipe is oriented in a 20° to 50° angle in regards to a vertical axis.

16. The fluid inlet or outlet arrangement according to claim 15,
wherein the fluid pipe is oriented in a 30° to 45° angle, in regards to the vertical axis.

17. A gas turbine engine, comprising
a compressor, a combustor, a turbine, and
the fluid inlet or outlet arrangement according to claim 12, wherein the fluid pipe is located upstream of a compressor inlet or downstream of a compressor exit, a location downstream of the compressor exit being in a turbine section of the gas turbine engine or a transition section between a compressor section and the turbine section of the gas turbine engine.

18. A pipe arrangement for a gas turbine engine for drainage of lube oil from bearings, comprising:
- a fluid pipe for guiding fluids, the fluids being the lube oil, and a coupling element for coupling the fluid pipe to an outer casing of the gas turbine engine, wherein
- the fluid pipe is located upstream of a compressor inlet or downstream of a compressor exit,
- a location downstream of the compressor exit being in a turbine section of the gas turbine engine or a transition section between a compressor section and the turbine section of the gas turbine engine, wherein
- the coupling element is configured to provide a first connection between the coupling element and the outer casing of the gas turbine engine by a first end of the coupling element,
- the coupling element provides a second connection between the coupling element and a first surface section of the fluid pipe by a second end of the coupling element, wherein the first surface section of the fluid pipe comprises an outer surface of reduced outer diameter facing radially outward with respect to an axis of symmetry of the fluid pipe, and wherein a radially inward facing surface of the coupling element contacts the first surface section and the coupling element abuts a step in the fluid pipe adjacent the first surface section, effective as a stop to prevent movement of the first surface section toward the first end of the coupling element,
- the coupling element comprises a sleeve portion surrounding a second surface section of the fluid pipe and being spaced apart to the second surface section of the fluid pipe, wherein the sleeve portion extends from the first end of the coupling element to the second end of the coupling element and comprises an inner diameter that does not vary along an entire axial length of the sleeve portion, wherein an area of contact between the coupling element and the fluid pipe is limited to the second connection,
- wherein the fluid pipe comprises a first pipe section that pierces the outer casing of the gas turbine engine and a second pipe section projecting from the outer casing of the gas turbine engine, the first pipe section being contact-less where piercing the outer casing of the gas turbine engine and
- wherein the fluid pipe and the coupling element are formed from a monolithic body or are immovably secured to each other.

* * * * *